Patented May 25, 1948

2,442,021

UNITED STATES PATENT OFFICE 2,442,021

SECTIONALIZED VARIABLE-SPEED DRIVE

Herbert A. Rose, Pittsburgh, Pa., assignor to Westinghouse Electric Corporation, East Pittsburgh, Pa., a corporation of Pennsylvania Application November 16, 1944, Serial No. 563,730

8 Claims. (Cl. 318—45)

My invention relates to a variable speed drive and particularly to a variable speed direct-current motor drive supplied from an alternating-current source.

In the utilization of high power direct-current drives, it is often desirable and frequently necessary to divide the motor into a plurality of motor units. For instance, in the utilization of a 4500 H. P. drive for testing airplane propellers, it may be desirable to assemble three 1500 H. P. motor armatures driving the same shaft. These three armatures can then be fed direct-current power either in series or parallel at a suitable supply voltage.

My invention relates to a system of connections in which the motor units or sections are connected alternately in series with valve type rectifiers or converters which supply power thereto.

The utilization of an alternate series connection has the advantage that while the motors are in series and thus receive the same current and produce the same torque, the voltage to ground at any point will only be the unit motor voltage.

The utilization of the alternate series connection provides the further advantage that an arc back in any of the valves of the converters can only result in a local short circuit as the remaining rectifiers effectively prevent reverse current in the circuit. Therefore, I utilize unit breakers in series with each of the valves of the converters to terminate any local fault condition without shutting down the motors.

By supplying each of the rectifier units in parallel from an alternating-current source of power, it is possible to utilize a voltage-regulating device such as an auto-transformer to maintain power at any given speed at maximum power factor. Variations from the maximum power can be secured by shifting the commutation angle in the converters or a converter to reduce the total current supplied to the motors.

It is accordingly an object of my invention to provide a high-power variable speed motor drive.

It is a further object of my invention to provide a motor drive utilizing alternate series connections of the motor units with individual converter units.

It is a further object of my invention to provide an efficient variable speed motor drive.

It is a further object of my invention to provide a variable speed motor drive operable at a high power factor.

It is a further object of my invention to provide a variable speed drive in which the speed may be readily varied or controlled.

Figure 1:
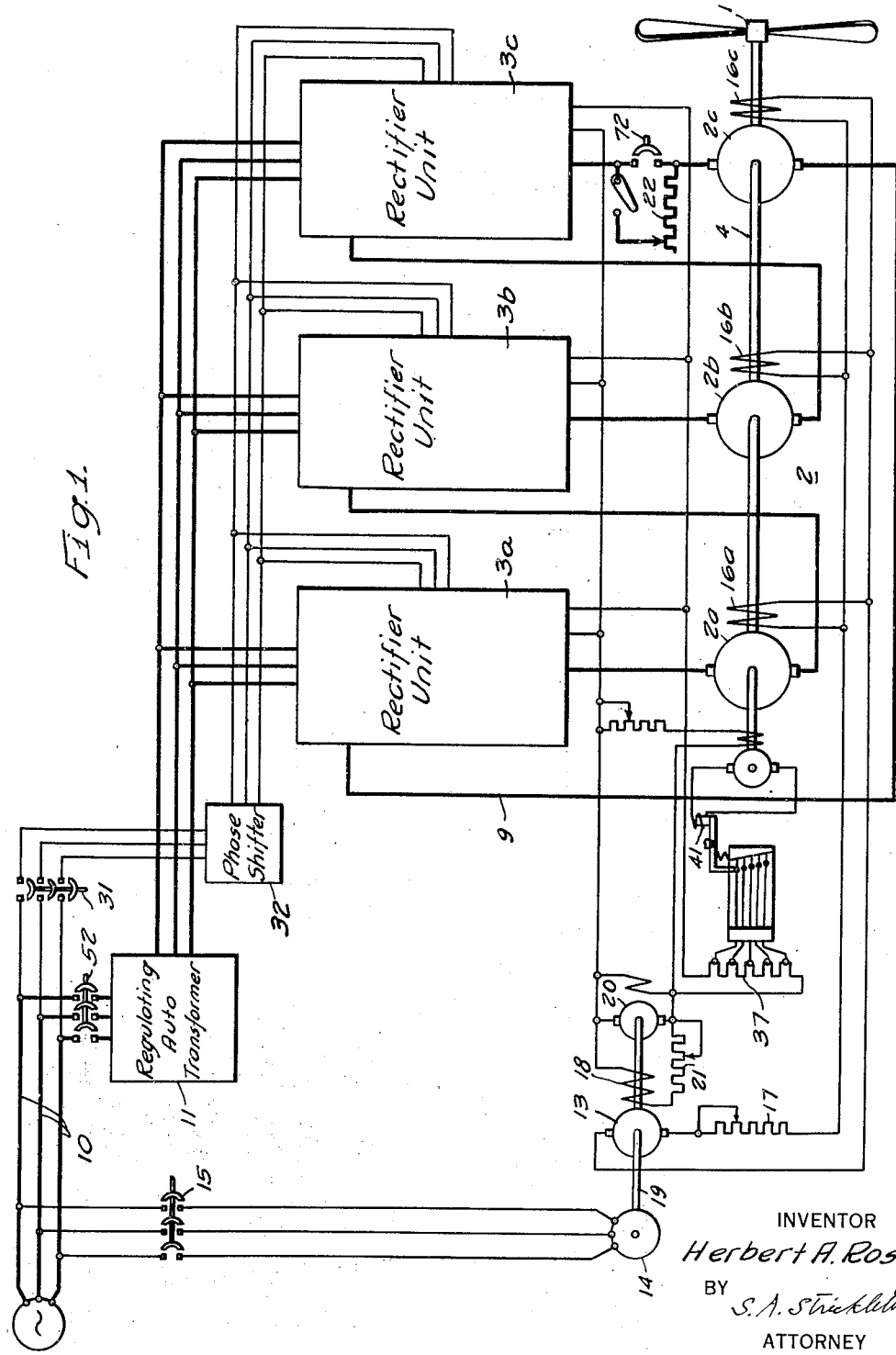
Figure 2:
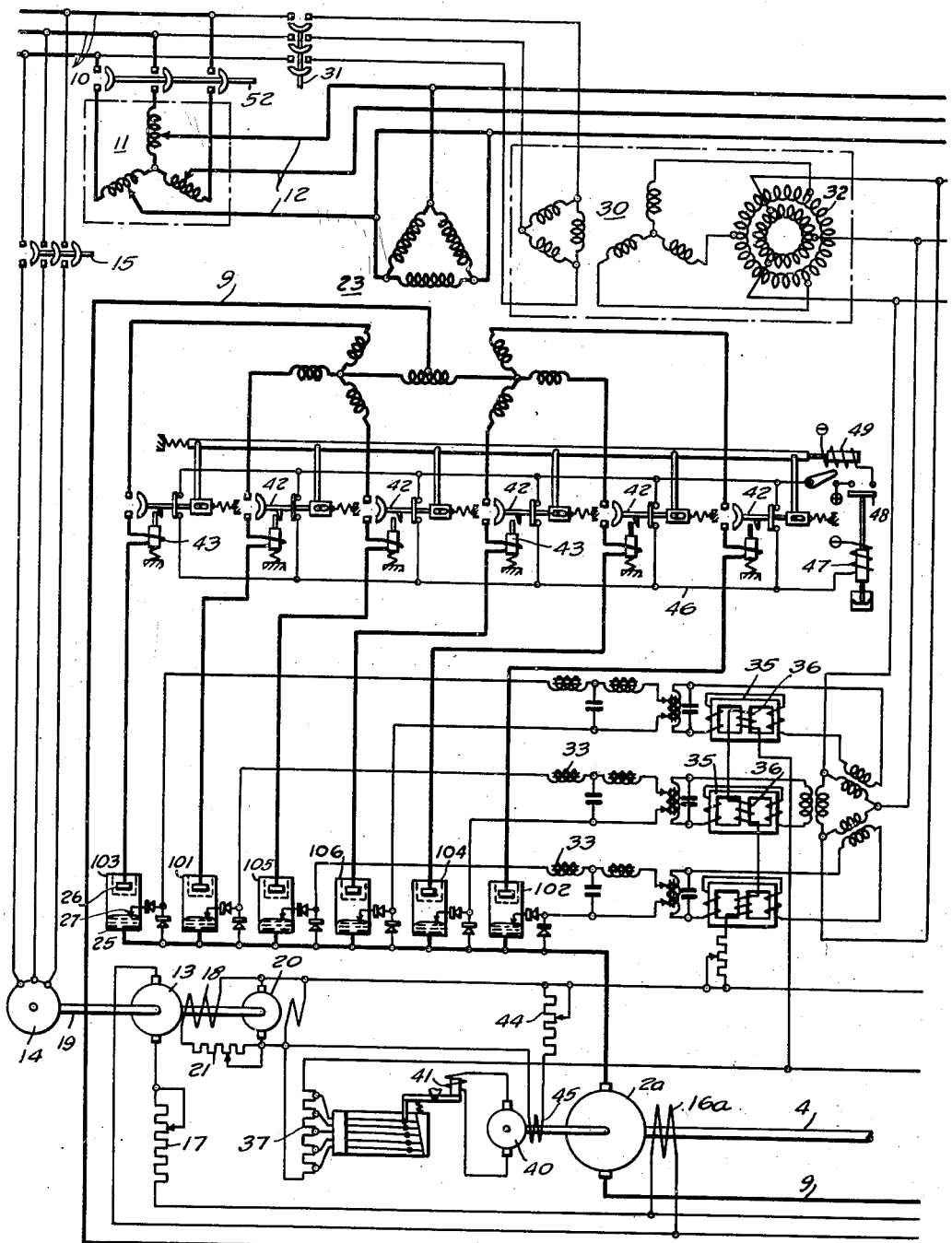

Other objects and advantages of my invention will be apparent from the following detailed description, taken in conjunction with the accompanying drawing, in which:

Figure 1 is a schematic illustration of a motor drive according to my invention; and Fig. 2 is a schematic illustration showing the complete connection through a section of my motor drive.

In the exemplary embodiment according to my invention, a variable speed load 1 herein illustrated as a propeller or fan is driven by a high-power direct-current motor 2 which is constructed as a plurality of elements. For purposes of illustration the motor 2 is divided into three elements 2a, 2b, 2c mounted on a common shaft 4, each of the elements 2a, 2b, 2c being provided with a separate rectifier unit 3a, 3b, 3c, the rectifier units 3a to 3c and motor units 2a to 2c being connected in alternate series connection in the direct-current circuit 9 while the motor drive is provided with power from an alternating-current source herein illustrated as an alternating-current circuit 10, the voltage of which is controlled by means of a voltage regulator herein illustrated as an autotransformer 11. For purposes of simplicity, the converters 3a to 3c are connected in parallel to an alternating-current circuit 12 so that a single voltage regulating device 11 may be utilized to simultaneously control the voltage supplied to each of the converters 3a—3c and thereby the maximum voltage available in the direct-current system.

While the motors 2a to 2c may be excited in any desired manner, I prefer to provide a separate excitation from an exciter generator 13 driven at substantially constant speed by any means, such as the motor 14 supplied with power from the alternating-current circuit 10 by way of switch 15. The voltage of the field windings 16a to 16c of the motors 2a to 2c may be controlled either by means of a series impedance herein shown as a resistor 17 or by means of varying the field 18 of the exciting generator 13. For this purpose, I provide a substantially constant potential control generator 20 which may be mounted on the same shaft 19 with the driving motor 14 and the excitation generator 13 and provide a control impedance 21 between the control generator 20 and the field 18 of the excitation generator 13.

Because of the series connection of the rectifier units and the motor units, a single control breaker 72 may be utilized for controlling the flow of power in motor circuit 9 and I prefer to provide a starting impedance 22 in shunt with the control breaker 72 so that power may be applied gradually to the load 1.

The individual converter units comprise a plurality of sequentially operable valves 101 to 106 supplied with potential from a suitable converter transformer 23 herein shown as of the double three-phase type. For purposes of illustration, I have shown the valves 101 to 106 as of the make-alive type in which each valve comprises a vaporizable reconstructing cathode 25 of suitable material such as mercury, a cooperating main anode 26 such as connected to the terminals of a converter transformer and a control electrode 27 of the make-alive type for periodically initiating a cathode spot in the valve. Obviously other types of valves or transformer connections may be utilized as occasion may warrant.

Excitation potential for the valves is secured from any suitable source herein illustrated as an excitation transformer 30 connected to the alternating-current source 10 by means of a circuit breaker 31. A phase-shifting device 32 herein illustrated as of the induction type is utilized to shift the phase of the excitation potential as may be desired. Each of the converter sections 3a to 3c is provided with an impulsing system for periodically applying excitation impulses to the make-alive electrodes 27.

For purposes of illustration, I have shown this impulsing system as of the wave distorter type in which a saturable reactor 33 is utilized to apply to the make-alive electrodes 27 periodic impulses of relatively steep wave front and short duration. Each impulsing system is provided with its individual phase-shifting device herein illustrated as of the impedance type in which a variable reactor 35 is utilized to control the phase impulses produced by the impulsing systems. The biasing windings 36 of the phase-shifting impedances 35 are connected across the terminals of the control generator 20 and impedance means 37 herein illustrated as of the variable resistor type known in the trade as a "Silverstat," is utilized to vary the current flowing in the biasing windings 36 of the phase-shifting impedances 35. The variable resistor 37 is controlled by a pilot generator 40 preferably mounted on the same shaft 4 with the motor units 2a—2c and having an output potential connected to an operating element 41 for varying the resistance 37. The speed of the motors 2a to 2c may then be regulated by controlling the field 45 of the pilot generator 40 to vary the speed voltage ratio of the pilot generator 40. The field 45 may be supplied from any substantially constant source and is illustrated as supported from the control generator 20 through variable resistor 44.

In the operation of the system according to my invention, power is supplied to the converter units by closing the series breaker 52 and by closing the breaker 31 to supply control potential to the impulsing systems. The voltage regulating device, such as the autotransformer 11, is adjusted to provide the maximum power desired for the motors 2a—2c. The fields 16a—16c of the motors 2a—2c are established by closing breaker 15 thus starting excitation generator 13 and control generator 20 after which the starting resistance 22 is connected across the circuit breaker 72 and the current raised to normal, after which the breaker 72 is closed and the starting resistance 22 cut out of the circuit.

Speed control will then be established by operating the main phase shifter 32 and maintained by means of the individual phase shifters 35. The main phase-shifter 32 being adjusted to provide the desired voltage and the individual phase shifters 35 being adjusted by means of the field regulator 44 of the pilot generator 40 so that the impedance 37 in series with the biasing windings 36 of the individual phase shifters 35 is operable within the range of the main phase shifter 32.

While I have shown the phase shifters 32 and 35 as being independently regulated, it will be desirable in many applications to interconnect the control system for the individual phase shifters 35 and the main phase shifter 32, as shown in my copending application Serial No. 531,093, filed April 14, 1944, now Patent No. 2,394,013, and assigned to the same assignee as this invention.

While the alternate series connection prevents reverse current in the motor system, a fault in any valve of a converter may be controlled by means of a series reverse current operated breaker 42. For purposes of operating these breakers 42, I have shown a polarized relay 43 for tripping the breaker 42 of any faulty anode. The opening of any breaker 42 closes a supervisory circuit 46 which energizes a time delay 47 which, after a predetermined interval, closes its contact 48 and operates a reset relay 49 which closes in any open anode breaker 42.

While for purposes of illustration, I have shown and described my invention as applied to a particular system of connections and as embodying various devices diagrammatically shown, it will be apparent to those skilled in the art that changes and modifications can be made therein without departing from the true spirit of my invention.

I claim as my invention:

1. A power control system comprising a plurality of direct-current motors connected to act in unison, a source of alternating power for said motors, a valve-type converter for each of said motors, said motors and said converters being connected in alternate series circuit relation, said converters being supplied in parallel from said source, voltage regulating means interposed between said source and said converters, a control electrode for each valve of each of said converters, a source of alternating control potential, a wave distorting impulse system for each of said converters, phase-shifting means connected between said source of control potential and said impulsing systems, a control electrode for each valve of said converters, connections from said impulsing systems to said control electrodes, phase-shifting means for each of said impulsing systems, a source of substantially constant operating potential for said phase-shifting means, connections including a variable impedance for impressing said potential on said phase-shifting means and means dependent on the speed of said motors for varying said variable impedance.

2. A variable speed motor drive comprising a load, a plurality of direct-current motors for driving said load, a source of alternating-current supply for said drive, a converter unit for each of said motors, said motors and said converters being connected in alternate series circuit relation on the direct-current side, said converters being connected in parallel to said alternating-current source and an autotransformer connected between said source and said converters for controlling the potential applied to said converters.

3. A power system comprising a plurality of direct-current motors, a source of alternating-current power, an electric valve converter for each of said motors, said motors and said converters being connected in alternate series circuit relation, said converters being connected in parallel to said source, a source of alternating control potential, impulsing systems connected to said source for supplying control impulses to each of said converters, phase-shifting means common to all of said impulsing systems, individual phase-shifting means in each of said systems, and means for simultaneously actuating each of said individual phase-shifting means.

4. A power system comprising a plurality of direct-current motors, a source of alternating-current power, an electric valve converter for each of said motors, said motors and said converters being connected in alternate series circuit relation, said converter being connected in parallel to said source, a source of alternating control potential, impulsing systems for supplying control impulses to each of said converters, phase-shifting means common to all of said impulsing systems, individual phase-shifting means in each of said systems, a generator driven by said motors and means responsive to the output of said generator for simultaneously actuating all of said individual phase-shifting means.

5. A power drive comprising a plurality of direct-current motors operating as a unitary device, a source of alternating current for operating said drive, a vapor-electric valve type converter for each of said motors, said motors and converters being connected in alternate series circuit relation, said converters being supplied in parallel from said alternating-current source and a voltage regulating device connected between said source and said converters.

6. A high-power motor drive comprising a plurality of direct-current motors for operating at a common speed, a source of alternating-current power, a valve type converter for each of said motors, said converters and said motors being connected in alternate series circuit relation on the direct-current side, said converters being connected in parallel on the alternating-current sides, each of said converters including a plurality of make-alive type valves, an impulsing system for each of said converters to control operation of the individual valves thereof, phase-shifting reactors for each impulsing system, a source of substantially constant biasing potential for said reactors and means for varying the current supplied to said reactors from said source for controlling the power supplied to said motors.

7. A variable speed drive comprising a plurality of direct-current motors connected to a common load, a rectifier for supplying current to each of said motors said rectifiers and motors being connected in alternate series relation.

8. A motor drive comprising a source of alternating-current power, a plurality of direct-current motors, an electric valve converter for each of said motors, said motors and said converters being connected in alternate series relation, said converters being connected in parallel to said source of alternating-current power, each of said converters including a plurality of make-alive type valves, an excitation system for the valves of each converter including a make-alive electrode in each valve, an impulsing system for each converter, said impulsing system being connected for sequentially energizing said make-alive electrodes, phase-shifting impedance means for each of said impulsing systems, a source of biasing potential for said phase-shifting impedances and means dependent on the motor speed for varying the potential applied to said phase-shifting impedances.

HERBERT A. ROSE.

REFERENCES CITED

The following references are of record in the file of this patent:

UNITED STATES PATENTS

| Number | Name | Date |
|---|---|---|
| 1,493,968 | Davis | May 13, 1924 |
| 1,865,930 | Thau | July 5, 1932 |
| 2,137,148 | Suits | Nov. 15, 1938 |
| 2,162,509 | Leukert | June 13, 1939 |
| 2,175,009 | Anderson | Oct. 3, 1939 |
| 2,205,214 | Leukert | June 18, 1940 |

FOREIGN PATENTS

| Number | Country | Date |
|---|---|---|
| 88,503 | Sweden | Feb. 16, 1937 |

OTHER REFERENCES

General Electric Review, April 1938, "Thyratron Control of D. C. Motors," G. W. Garman, pages 202—208, inclusive.